United States Patent [19]

Otobe et al.

[11] Patent Number: 4,483,299

[45] Date of Patent: Nov. 20, 1984

[54] METHOD FOR DETECTING ABNORMALITY IN SENSOR MEANS FOR DETECTING A PARAMETER RELATING TO INTAKE AIR QUANTITY OF AN INTERNAL COMBUSTION ENGINE

[75] Inventors: Yutaka Otobe, Shiki; Noriyuki Kishi, Itabashi, both of Japan

[73] Assignee: Honda Motor Co., Ltd., Tokyo, Japan

[21] Appl. No.: 517,791

[22] Filed: Jul. 27, 1983

[30] Foreign Application Priority Data

Aug. 12, 1982 [JP] Japan .................... 57-140343

[51] Int. Cl.³ .............................................. F02D 5/00
[52] U.S. Cl. ................................. 123/479; 123/494
[58] Field of Search ................ 123/479, 494, 198 D; 73/118; 364/431.11

[56] References Cited

U.S. PATENT DOCUMENTS

| 4,287,565 | 9/1981 | Haubner et al. | 123/479 X |
| 4,393,842 | 7/1983 | Otsuka et al. | 123/479 X |
| 4,428,355 | 1/1984 | Yokooku | 123/479 X |

FOREIGN PATENT DOCUMENTS

148925  11/1980  Japan ............................ 123/479

Primary Examiner—Tony M. Argenbright
Attorney, Agent, or Firm—Arthur L. Lessler

[57] ABSTRACT

A method for detecting abnormality in parameter sensor means for detecting the value of a parameter relating to the quantity of intake air being supplied to an internal combustion engine for use in control of the operation of the engine. Immediately upon closing of the ignition switch of the engine, an output value from the parameter sensor means is stored. When an output value from the parameter sensor means remains substantially equal to the stored value for a predetermined period of time while simultaneously the rotational speed of the engine remains higher than a predetermined value, the parameter sensor means is regarded as abnormal. Upon determination of occurrence of such abnormality, a predetermined value of the parameter previously stored is used for control of the operation of the engine, in place of an actual output value from the parameter sensor means. The parameter sensor means includes a pressure sensor for detecting pressure in the intake passage of the engine, and an intake air quantity sensor for detecting the intake air quantity per se. Preferably, when the engine is decelerating with the fuel supply cut off, the above determination of abnormality in the parameter sensor means is prohibited.

9 Claims, 6 Drawing Figures

METHOD FOR DETECTING ABNORMALITY IN SENSOR MEANS FOR DETECTING A PARAMETER RELATING TO INTAKE AIR QUANTITY OF AN INTERNAL COMBUSTION ENGINE

BACKGROUND OF THE INVENTION

This invention relates to a method for detecting abnormality in sensor means for detecting a parameter relating to a quantity of intake air being supplied to an internal combustion engine, as well as for effecting a fail safe function in the event of occurrence of such abnormality.

A fuel supply control system adapted for use with an internal combustion engine, particularly a gasoline engine has been proposed e.g. by U.S. Pat. No. 3,483,851, which is adapted to determine the fuel injection period of a fuel injection device for control of the fuel injection quantity, i.e. the air/fuel ratio of an air/fuel mixture being supplied to the engine, by first determining a basic value of the above valve opening period as a function of engine rpm and intake pipe absolute pressure and then adding to and/or multiplying same by constants and/or coefficients being functions of engine rpm, intake pipe absolute pressure, engine temperature, throttle valve opening, exhaust gas ingredient concentration (oxygen concentration), etc., by electronic computing means.

In such fuel supply control system, when an output from a parameter sensor for detecting the value of a parameter relating to the operating condition of the engine shows an abnormal value due to disconnection in the wiring system of the parameter sensor, etc., the fuel injection quantity is not controlled to proper values, badly affecting the operation of the engine such as driveability, if the control of the fuel injection quantity is continued on such occasion by using such abnormal value as an actual value of the parameter. Therefore, a fail safe measure is necessary which ensures continued operation of the engine even in the event of occurrence of a failure in parameter sensor means, i.e. a failure in the sensor body itself, the wiring system. To comply with such necessity, a method has been proposed e.g. by Japanese Provisional Patent Publication (Kokai) No. 54-141926, which comprises assuming that an abnormality occurs in a parameter sensor when an output from the parameter sensor shows a value lying outside a predetermined normal output value range, and then applying a predetermined value of the parameter to control of the fuel supply quantity to the engine, in place of an actual output value from the parameter sensor.

However, such abnormality detecting method cannot be applied to a case where an output from the parameter sensor shows a value lying within the predetermined normal output value range even when an abnormality actually occurs in the parameter sensor. More specifically, for instance, in the event that a pipe connecting an intake pipe pressure sensor with the intake pipe of the engine becomes disconnected from either the pressure sensor or the intake pipe, the pressure in the intake pipe does not act upon the pressure sensor and consequently the output from the pressure sensor shows a value constant relative to the atmospheric pressure irrespective of actual changes in the pressure in the intake pipe. If in such event the constant output value lies within a normal output value range which can take place during normal operation of the engine, it is impossible to detect such abnormality in the parameter sensor means as caused by disconnection of the pipe connecting the pressure sensor with the intake pipe.

SUMMARY OF THE INVENTION

It is the object of the invention to provide an abnormality detecting method for sensor means for detecting a parameter relating to the intake air quantity into an internal combustion engine, which is capable of positively detecting an abnormality in the sensor means, particularly the abnormality that the output from the sensor means shows a substantially constant value lying within a normal output value range that can occur during normal operation of the engine, despite occurrence of an accident such as disconnection of the piping system of the sensor means, and which is also capable of performing a fail safe function so as to ensure at least continuation of the operation of the engine even in the event of occurrence of such abnormality in the sensor means.

According to a first aspect of the invention, there is provided a method for detecting an abnormality in parameter sensor means for detecting the value of a parameter relating to the quantity of intake air being supplied to an internal combustion engine for use in control of the operation of the engine, comprising the steps of: (1) storing an output value from the parameter sensor means generated immediately after closing of the ignition switch of the engine, (2) detecting the rotational speed of the engine, (3) comparing an output value from the above parameter sensor means with the output value from the same sensor means, stored in the step (1), and (4) regarding the parameter sensor means as abnormal when the parameter sensor means continuously generates an output value substantially equal to the above stored value for a predetermined period of time while simultaneously the rotational speed of the engine remains higher than a predetermined value.

According to a second aspect of the invention, the method includes, in addition to the above-mentioned steps of the first aspect thereof, the step of applying a predetermined value, which is previously stored, to control of the operation of the engine, in place of an actual output value from the parameter sensor means, when the parameter sensor means is regarded as abnormal.

The above parameter sensor means includes a pressure sensor for detecting pressure in the intake passage of the engine, and an intake air quantity sensor for detecting the intake air quantity per se.

Preferably, the methods according to both of the first and second aspects of the invention include the further steps of determining whether or not the engine is operating in a predetermined decelerating region wherein supply of fuel to the engine is to be interrupted, and prohibiting the determination of abnormality in the parameter sensor means when the engine is determined to be operating in the predetermined decelerating region.

The above and other objects, features and advantages of the invention will become more apparent from the ensuing detailed description taken in conjunction with the accompanying drawings.

DETAILED DESCRIPTION

The invention will now be described in detail with reference to the drawings.

Figure 1:
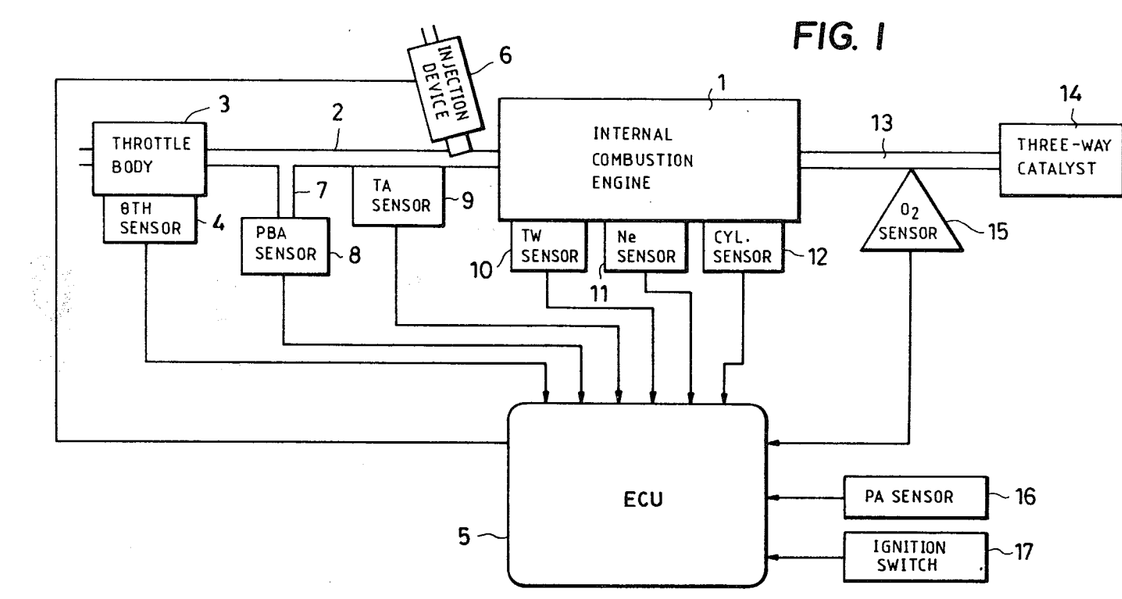
FIG. 1 is a block diagram illustrating the whole arrangement of a fuel supply control system for an internal combustion engine, to which is applied the method according to the invention.

Referring first to FIG. 1, there is illustrated the whole arrangement of a fuel supply control system for internal combustion engines according to the invention. Reference numeral 1 designates an internal combustion engine which may be a four-cylinder type, for instance. An intake pipe 2 is connected to the engine 1, in which is arranged a throttle valve 3, which in turn is coupled to a throttle valve opening ($\theta$TH) sensor 4 for detecting its valve opening and converting same into an electrical signal which is supplied to an electronic control unit (hereinafter called "ECU") 5.

Fuel injection valves 6 are arranged in the intake pipe 2 at a location between the engine 1 and the throttle valve 3, which correspond in number to the engine cylinders and are each arranged at a location slightly upstream of an intake valve, not shown, of a corresponding engine cylinder. These fuel injection valves 6 are connected to a fuel pump, not shown, and also electrically connected to the ECU 5 in a manner having their valve opening periods or fuel injection quantities controlled by signals supplied from the ECU 5.

On the other hand, an absolute pressure sensor (PBA) 8 communicates with the interior of the intake pipe 2 at a location immediately downstream of the throttle valve 3. The absolute pressure sensor 8 is adapted to detect absolute pressure in the intake pipe 2 and applies an electrical signal indicative of detected absolute pressure to the ECU 5. An intake air temperature (TA) sensor 9 is arranged in the intake pipe 2 at a location downstream of the absolute pressure sensor 8 and also electrically connected to the ECU 5 for supplying same with an electrical signal indicative of detected intake air temperature.

An engine temperature (TW) sensor 10, which may be formed of a thermistor or the like, is mounted on the main body of the engine 1 in a manner embedded in the peripheral wall of an engine cylinder having its interior filled with cooling water, an electrical output signal of which is supplied to the ECU 5.

An engine speed sensor (hereinafter called "Ne sensor") 11 and a cylinder-discriminating sensor 12 are arranged in facing relation to a camshaft, not shown, of the engine 1 or a crankshaft of same, not shown. The former 11 is adapted to generate one pulse at a particular crank angle of the engine each time the engine crankshaft rotates through 180 degrees, i.e., upon generation of each pulse of a top-dead-center position (TDC) signal, while the latter is adapted to generate one pulse at a particular crank angle of a particular engine cylinder. The above pulses generated by the sensors 11, 12 are supplied to the ECU 5.

A three-way catalyst 14 is arranged in an exhaust pipe 13 extending from the main body of the engine 1 for purifying ingredients HC, CO and NOx contained in the exhaust gases. An $O_2$ sensor 15 is inserted in the exhaust pipe 13 at a location upstream of the three-way catalyst 14 for detecting the concentration of oxygen in the exhaust gases and supplying an electrical signal indicative of a detected concentration value to the ECU 5.

Further connected to the ECU 5 are a sensor 16 for detecting the atmospheric pressure (PA) and an ignition switch 17 of the engine 1, which are also electrically connected to the ECU 5 so that the ECU 5 is supplied with an output signal from the sensor 16, a supply voltage from a power source, not shown, by way of the ignition switch 17 as well as a signal from the same switch 17, indicative of the on-state and off-state positions of same.

The ECU 5 is adapted to determine whether or not there occurs an abnormality in the value of the output signal from the intake pipe absolute pressure sensor 8, in a manner hereinafter described, and also determine operating conditions of the engine to calculate the fuel injection period TOUT for the fuel injection valves 6 on the basis of determined operating conditions of the engine, by the use of the following equation, in synchronism with generation of pulses of the TDC signal from the Ne sensor 11:

$$TOUT = Ti \times K_1 + TK_2 \quad (1)$$

where Ti represents a basic value of the fuel injection period which is calculated as a function of values of intake pipe absolute pressure PB and engine rpm Ne, and K1, K2 represent correction coefficients and correction values, values of which are calculated in response to values of output signals from the aforementioned various sensors, that is, the throttle valve opening sensor 4, the intake pipe absolute pressure sensor 8, the intake air temperature sensor 9, the engine water temperature sensor 10, the Ne sensor 11, the cylinder-discriminating sensor 12, the $O_2$ sensor 15, the atmospheric pressure sensor 16, and the ignition switch 17, by the use of respective equations, so as to achieve optimum operating characteristics of the engine such as startability, emission characteristics, fuel consumption and accelerability.

When the ECU 5 determines that the engine is operating in a predetermined decelerating or fuel-cut region requiring interruption of the fuel supply to the engine, it sets a value of the fuel injection period TOUT calculated by the above equation (1) to zero.

The ECU 5 operates on values of the fuel injection period TOUT calculated as above to supply driving signals to the fuel injection valves 6 to energize same.

Figure 2:
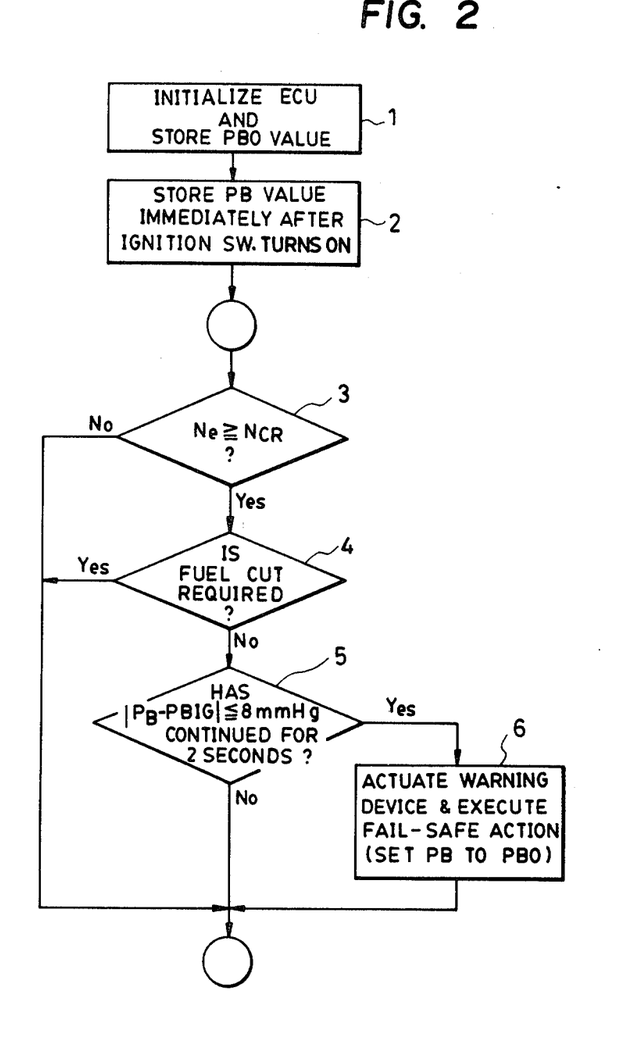
FIG. 2 is a flow chart showing a manner of detection of an abnormality in the output value from an intake pipe absolute pressure sensor, according to the method of the invention.

FIG. 2 shows a flow chart of a manner of determining an abnormality in the value of an output signal indicative of the intake pipe absolute pressure PB from the intake pipe absolute pressure sensor 8, the program of which is executed within the ECU 5.

First, at the start of the engine, the ignition switch 17 in FIG. 1 is turned on or closed to cause initialization of the ECU 5, at the step 2. On this occasion, a predetermined value PB0 of intake pipe absolute pressure is stored into a register within the ECU 5, for use in place of the value of an actual output signal from the intake pipe absolute pressure sensor 8 in the event of occurrence of an abnormality in the intake pipe absolute pressure sensor 8 and its related piping system. Then, the value of an output signal from the absolute pressure sensor 8 is detected and stored into a register within the ECU 5 as a value PBIG at a time immediately after the ignition switch 17 has been turned on, at the step 2. The above steps 1 and 2 are executed only one time when the ignition switch 17 is turned on at the start of the engine, and once these steps have been executed, the following steps 3 through 6 are executed each time a pulse of the TDC signal is generated.

At the step 3, it is determined whether or not the rotational speed Ne of the engine sensed by the Ne sensor 11 in FIG. 1 exceeds a predetermined value NCR, for instance 400 rpm. If the answer is no, the present program is terminated without executing the below-mentioned determination of abnormality in the absolute pressure sensor 8. If the answer to the question of the step 3 is affirmative, it is then determined whether or not the engine is operating in the aforementioned predetermined decelerating or fuel-cut region, at the step 4.

The determination of the step 4 is provided for the following reason: In the event that while the engine is decelerating with the throttle valve fully closed during running of the vehicle on a long descending slope, there occurs no substantial change in the intake pipe absolute pressure due to full closing of the throttle valve. During such deceleration of the engine, even if the ignition switch 17 is first turned off and then turned on, the intake pipe absolute pressure can continue to assume a value substantially equal to the value PBIG detected and read upon the above turning-on of the ignition switch 17, for a predetermined period of time. As a consequence, the ECU 5 makes a wrong judgement that there is an abnormality in the absolute pressure sensor 8 or in its piping system. Therefore, according to the invention, when the engine is operating in the aforementioned predetermined fuel-cut region while the rotational speed Ne of the engine exceeds the predetermined value NCR (that is, if the answer to the question of the step 4 is affirmative), the determination as to abnormality of the absolute pressure sensor 8 and its piping system is not carried out, but the program is immediately terminated.

If the answer to the question of the step 4 is negative, the program proceeds to the step 5, wherein a determination is made as to whether or not the difference between a detected absolute pressure value PB read in the present loop of execution of the program and a detected absolute pressure value PBIG read upon closing of the ignition switch 17 in the step 2 is smaller than a predetermined value and at the same time the difference has remained smaller than the predetermined value for a predetermined period of time, e.g. 2 seconds. The above predetermined value of the difference is set at a small value such that the absolute pressure value PB read in the present loop can be regarded as substantially equal to the absolute pressure value PBIG, for instance, it is set at 8 mmHg. If the answer to the question of the step 5 is negative, it is judged that there is no abnormality in the absolute pressure sensor 8 and its related piping system. On the contrary, if the answer is affirmative, that is, when the output value PB from the absolute pressure sensor 8 has remained unchanged and held at a value substantially equal to the value PBIG read upon closing of the ignition switch 17 for the above predetermined period of time, it is judged that there is an abnormality in the absolute pressure sensor 8 or in its piping system, and then the ECU 5 executes the step 6 to effect a warning action and a fail safe action. The warning action and the fail safe action can be effected in various forms. For example, the former may include actuating a warning device such as an alarm lamp, while the latter may include applying the aforementioned predetermined value PB0 of intake pipe absolute pressure (e.g. 460 mmHg) to the aforegiven equation (1) for calculation of the fuel injection period TOUT. By thus applying this predetermined value PB0 in the event of occurrence of an abnormality in the absolute pressure sensor 8, an abnormal increase in the fuel supply quantity to the engine can be prevented.

The above warning and fail safe actions of the step 6 are continuously executed in the event of occurrence of an abnormality in the absolute pressure sensor 8, at least until the ignition switch 17 becomes turned off.

Figure 3:
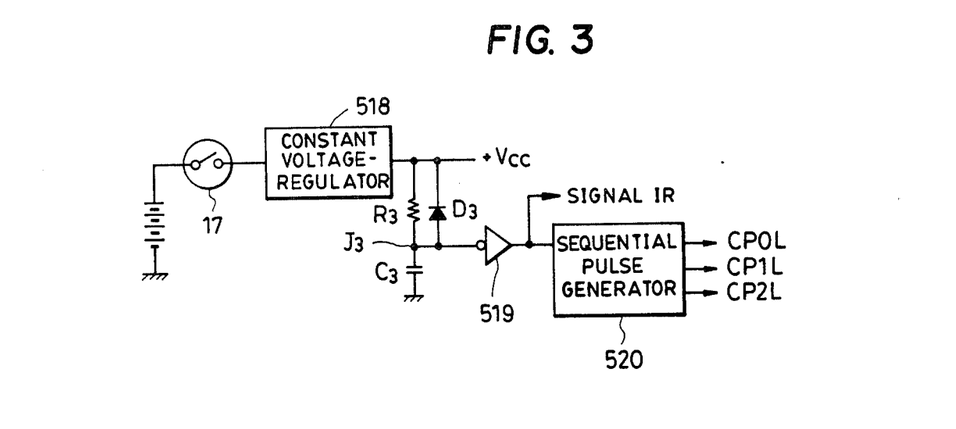
FIG. 3 is a circuit diagram showing a circuit for generating a single pulse signal IR and sequential pulses CP0L-CP2L upon closing of the ignition switch of the engine.
Figures 4, 4A:
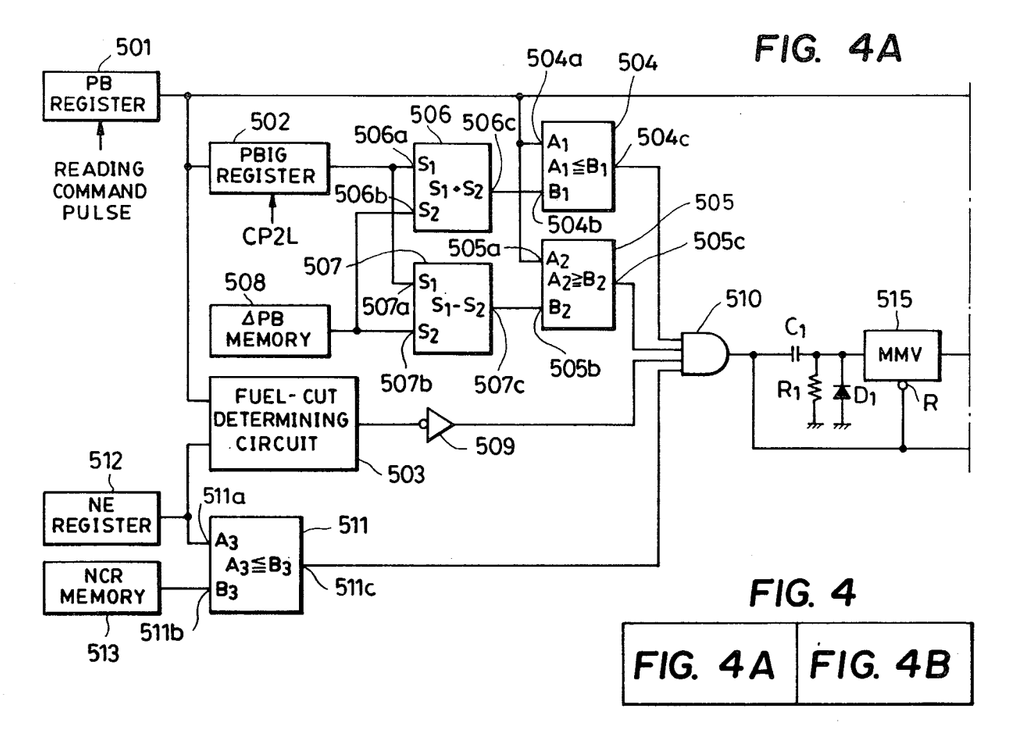
FIGS. 4A and 4B are a circuit diagram showing an example of a circuit for determining an abnormality in the output value from the intake pipe absolute pressure sensor.

FIGS. 3 and 4 show, by way of example, a circuit provided within the ECU 5 for carrying out the determination of an abnormality in the absolute pressure sensor 8 and its related piping system, shown in FIG. 2.

Referring first to FIG. 3, a circuit is illustrated, which generates a control pulse signal IR and a sequential pulse signal comprising pulses CP0L to CP2L for use in the abnormality determining circuit of FIG. 4, hereinafter described. The ignition switch 17 in FIG. 1 is connected to the input of a constant voltage regulator 518, the output of which is connected to a pulse generator circuit which is formed of a pair of a resistance R3 and a capacitor C3 serially connected together between the output of the constant voltage regulator 518 and the ground, and a diode D3 connected in parallel with the resistance R3 and between the junction J3 of the resistance R3 with the capacitor C3 and the output of the constant voltage regulator 518. When the ignition switch 17 is turned on, the constant voltage regulator 518 generates a regulated voltage +Vcc at its output and at the same time, a low level pulse is generated at the junction J3 of the pulse generator circuit and is inverted by an inverter 519 into a high level pulse as a signal IR. As noted above, this single pulse signal IR is generated only when the ignition switch 17 is closed and applied to a sequential pulse generator 520 as well as to a set pulse input terminal S of a flip flop 521 in FIG. 4, hereinafter referred to. The sequential pulse generator 520 is responsive to the signal IR to successively generate pulses CP0L, CP1L and CP2L, and these pulses are used as command signals for reading a value of intake pipe absolute pressure PB, hereinafter referred to, immediately upon closing of the ignition switch 17.

Referring next to FIG. 4, an output signal from the absolute pressure sensor 8 in FIG. 1 is converted into a digital signal by an A/D converter, not shown, and is applied to a PB value register 501. This digital signal is loaded into the PB value register 501 each time a reading command pulse is applied to the latter. During rotation of the engine, the above reading command pulse applied to the PB value register 501 is supplied from a pulse generator, not shown, which operates in synchronism with generation of pulses of the TDC signal from the Ne sensor 11, while immediately when the ignition switch 17 is closed, the reading command pulse is supplied from the sequential pulse generator 520 in FIG. 3, since the engine is not then rotating and accordingly no pulse of the TDC signal is then generated. More specifically, the first sequential pulse CP0L generated from the sequential pulse generator 520 is applied to the aforementioned A/D converter, not shown, to command analog-to-digital conversion of the output signal from the absolute pressure sensor 8. The second sequential pulse CP1L is applied to the PB value register 501 as a reading command pulse to cause loading of a digital value of intake pipe absolute pressure PB resulting from the above A/D conversion by means of the first sequential pulse CP0L, into the PB value register 501. The third sequential pulse CP2L is applied to a PBIG value register 502 to cause loading of the digital value of intake pipe absolute pressure from the PB value register 501 into the PBIG register 502. The PBIG value register 502 is supplied with the above sequential pulse CP2L alone as a reading command pulse which is generated upon closing of the ignition switch 17. Therefore, a value stored in the PBIG value register 502 is not updated unless the ignition switch 17 is again turned on after it has been turned off. In this way, a value of intake pipe absolute pressure PB read upon closing of the ignition switch 17 is loaded into the PBIG value register 502 and held there as a value PBIG. The value PBIG stored in the PBIG value register 502 is applied as an input $S_1$ to respective input terminals 506a and 507a of an adder 506 and a subtracter 507. The adder 506 and the subtracter 507 have their other input terminals 506b and 507b supplied as an input $S_2$ with a predetermined value $\Delta PB$ (e.g. 8 mmHg) from a $\Delta PB$ value memory 508. The adder 506 makes an addition of the input values $S_1$, $S_2$, and supplies the resulting sum $(S_1+S_2)$ to a comparator 504 through its input terminal 504b as an input $B_1$. The subtracter 507 subtracts the input value $S_2$ from the input value $S_1$, and supplies the resulting difference $(S_1-S_2)$ to a comparator 505 through its input terminal 505b as an input $B_2$. The comparators 504, 505 have their other input terminals 504a and 505a connected to the output of the PB value register 501 to be supplied with a detected value of intake pipe absolute pressure PB loaded therein, respectively, as an input $A_1$ and an input $A_2$. The comparator 504 compares the input $A_1$ with the input $B_1$, and when the relationship $A_1 \leq B_1$ stands, it generates a high level output of 1 and applies same to an AND circuit 510. The comparator 505 compares the input $A_1$ with the input $A_2$, and when the relationship $A_2 \geq B_2$ stands, it generates a high level output of 1 and applies same to the AND circuit 510. In other words, the comparators 504, 505 substantially compare the output value from the absolute pressure sensor 8 with the value PBIG detected and read at the time of closing of the ignition switch 17, and generate high level outputs of 1 when the difference between the two values is lower than the predetermined value $\Delta PB(=8 \text{ mmHg})$.

Figure 4B:
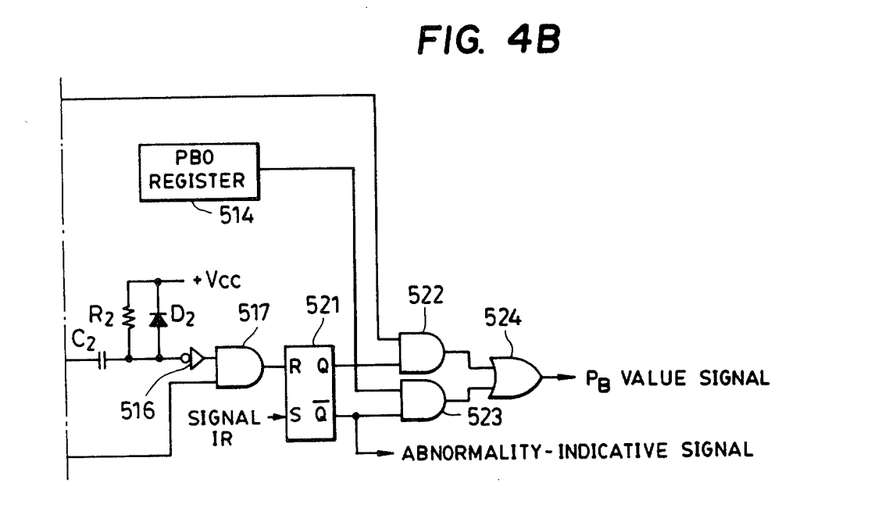

An NE value register 512 stores a value NE which is the reciprocal of an output value of the rotational speed Ne from the Ne sensor 11 in FIG. 1. This value NE is provided for the convenience of processing within the ECU and is proportional to a measured value of the time interval between adjacent pulses of the TDC signal from the Ne sensor 11, that is, the reciprocal of the engine rotational speed Ne. Thus, the value NE in the register 512 is updated each time a pulse of the TDC signal is generated. The value NE from the NE value register 512 is applied to a comparator 511 through its input terminal 511a as an input $A_3$. The comparator 511 has its other input terminal 511b supplied as an input $B_3$ with a value corresponding to the reciprocal of the predetermined engine rotational speed value NCR (400 rpm), stored in an NCR value memory 513. The comparator 511 compares the input value $A_3$ with the input value $B_3$, and when the relationship $A_3 > B_3$ stands, that is, when the engine rotational speed Ne is lower than the predetermined value NCR, it generates a low level output of 0 and applies same to the aforementioned AND circuit 510 to deenergize same. The deenergization of the AND circuit 510 renders inoperative an abnormality determining circuit, hereinafter referred to, which determines whether or not the difference between the output value from the absolute pressure sensor 8 and the value PBIG read at the time of closing of the ignition switch 17 has remained smaller than the predetermined value $\Delta PB$ (8 mmHg) for a predetermined period of time.

When the comparator 511 determines the fulfillment of the relationship $A_3 \leq B_3$, that is, when the engine rotational speed Ne is higher than the predetermined value NCR, it supplies a high level output of 1 to the AND circuit 510.

The outputs of the PB value register 501 and the NE value register 512 are also connected to the input of a fuel-cut determining circuit 503 to supply the latter with signals indicative of detected values of intake pipe absolute pressure PB and engine rotational speed Ne. The fuel-cut determining circuit 503 operates on these input signals to determine operating conditions of the engine, and generates a high level output of 1 when the engine is operating in a predetermined decelerating or fuel-cut region requiring interruption of the fuel supply to the engine. This high level output is inverted into a low level of 0 by an inverter 509, to cause deenergization of the AND circuit 510, thereby rendering the aforementioned abnormality determining circuit inoperative.

When all the inputs to the AND circuit 510, which are supplied from the comparators 504, 505 and 511, and the fuel-cut determining circuit 503 via the inverter 509 assume a high level of 1, the output from the AND circuit 510 goes low, which energizes an AND circuit 517 and also causes a differentiation circuit connected to the output of the AND circuit 510 and formed of a capacitor C1, a resistance R1 and a diode D1 to generate a single high level pulse. This single high level pulse is applied as a trigger pulse to a monostable multivibrator 515 which in turn generates a single high level pulse having a predetermined pulse duration, e.g. 2 seconds. The output from the monostable multivibrator 515 turns low upon the lapse of a predetermined period of time corresponding to the above predetermined pulse duration, which causes another differentiation circuit connected to the output of the monostable multivibrator 515 and formed of a capacitor C2, a resistance R2 and a diode D2 to generate a single low level pulse. This single low level pulse is inverted into a high level by an inverter 516, and applied to the reset pulse input terminal R of a flip flop 521 through the AND circuit 517 which is then in an energized state.

Upon being supplied with the above high level pulse, the Q-output from the flip flop 521 goes low, and is applied to an AND circuit 522 to deenergize same, while the $\overline{Q}$-output goes high and is applied to an AND circuit 523 to energize same. The input of the AND circuit 522 is connected to the output of the aforementioned PB value register 501. Therefore, the deenergization of the AND circuit 522 impedes delivery of the output value of intake pipe absolute pressure PB from the PB value register 501 through the AND circuit 522 and an OR circuit 524, while on the other hand, the predetermined value PB0 (460 mmHg) from a PB0 value register 514, which is applied to the AND circuit 523 then energized, is allowed to be delivered through the AND circuit 523 and the OR circuit 524. This predetermined value PB0 is loaded into the PB0 value register 514 when the ignition switch 17 is turned on to initialize the ECU 5 (the step 1 in FIG. 4), to be supplied to a fuel injection period calculating circuit, not shown, within the ECU 5 for use in calculation of the fuel injection period TOUT by the use of the aforegiven equation (1).

The aforementioned high level $\bar{Q}$-output from the flip flop 521 is also used as an abnormality-indicative signal for actuating the warning device such as an alarm lamp.

The Q-output and $\bar{Q}$-output from the flip flop 521 remain at the respective same levels after the flip flop has been reset by the reset pulse applied to its terminal R, until it is set by the aforementioned high level signal IR in FIG. 3, applied at its set pulse input terminal S, that is, until the ignition switch 17 is again turned on after it has once been turned off.

If the output from the AND circuit 510 goes low before the output from the monostable multivibrator 515 goes low upon the lapse of the predetermined period of time of 2 seconds, that is, if one of the following conditions stands: when the comparator 504 or 505 determines that the difference between the actual stored value PB and the value PBIG read at the time of closing of the ignition switch 17 becomes larger than the predetermined value $\Delta$PB, when the comparator 511 determines that the engine rotational speed Ne drops below the predetermined value NCR, and when the fuel-cut determining circuit 503 determines that the engine is operating in the predetermined decelerating or fuel-cut region, the low level output from the AND circuit 510 causes deenergization of the AND circuit 517 and at the same time causes resetting of the monostable multivibrator 515 to cause same to generate a low level output. On this occasion, a single low level pulse is generated by the differentiation circuit on the output side of the monostable multivibrator 515 in the same manner as previously stated. However, since the AND circuit 517 is then in a deenergized state before the generation of the single low level pulse, and therefore the flip flop 521 is never reset.

Although the foregoing embodiment is directed to determination of an abnormality in the output value from the intake pipe absolute pressure sensor 8 due to disconnection of the pipe 7 connecting the sensor 8 with the intake pipe 2 in FIG. 2 or a like cause, the invention is not limited to determination of an abnormality in the intake pipe absolute pressure, but it may be applied to various sensors insofar as they detect engine operation parameters having values varying with changes in the operating condition of the engine. For instance, the invention may be applied to an intake air quantity sensor for determination of an abnormality in the wiring system of the same sensor, etc. when the output from the sensor shows a value lying within a normal output value range despite occurrence of such abnormality.

Further, although the foregoing embodiment is applied to a fuel supply control system, the application of the invention is not limited to such fuel supply control systems, but the invention may of course be applied to various other engine control systems for controlling the operation of the engine, such as an ignition timing control system and an exhaust gas recirculation control system.

What is claimed is:

1. A method for detecting an abnormality in parameter sensor means for detecting the value of a parameter relating to the quantity of intake air being supplied to an internal combustion engine having an ignition switch, for use in control of the operation of said engine, the method comprising the steps of: (1) storing an output value from said parameter sensor means generated immediately after closing of said ignition switch of said engine; (2) detecting the rotational speed of said engine; (3) comparing an output value from said parameter sensor means with said output value from said sensor means, stored in said step (1); and (4) regarding said parameter sensor means as abnormal when it is determined in said steps (2) and (3) that said parameter sensor means continuously generates an output value substantially equal to said stored value for a predetermined period of time while simultaneously the rotational speed of said engine remains higher than a predetermined value.

2. A method as claimed in claim 1, wherein said engine includes an intake passage, said parameter sensor means comprising a pressure sensor for detecting pressure in said intake passage.

3. A method as claimed in claim 1, wherein said parameter sensor means comprises an intake air quantity sensor for detecting the quantity of intake air per se being supplied to said engine.

4. A method as claimed in claim 1, further including the steps of: determining whether or not said engine is operating in a predetermined decelerating region requiring interruption of the fuel supply to said engine; and prohibiting execution of said step (4) of regarding said parameter as abnormal, when it is determined that said engine is operating in said predetermined decelerating region.

5. A method for detecting an abnormality in parameter sensor means for detecting the value of a parameter relating to the quantity of intake air being supplied to an internal combustion engine having an ignition switch, for use in control of the operation of said engine, the method comprising the steps of: (1) storing beforehand a predetermined value of said parameter; (2) storing an output value from said parameter sensor means generated immediately after closing of said ignition switch of said engine; (3) detecting the rotational speed of said engine; (4) comparing an output value from said parameter sensor means with said output value from said sensor means, stored in said step (2); (5) regarding said parameter sensor means as abnormal when it is determined in said steps (3) and (4) that said parameter sensor means continuously generates an output value substantially equal to said value stored in said step (2) for a predetermined period of time while simultaneously the rotational speed of said engine remains higher than a predetermined value; and (6) applying said predetermined value stored in said step (1) to control of the operation of said engine in place of an output value from said parameter sensor means, when said parameter sensor means is regarded as abnormal in said step (5).

6. A method as claimed in claim 5, wherein said engine includes an intake passage, said parameter sensor means comprising a pressure sensor for detecting pressure in said intake passage.

7. A method as claimed in claim 5, wherein said parameter sensor means comprising an intake air quantity sensor for detecting the quantity of intake air per se being supplied to said engine.

8. A method as claimed in claim 5, further including the steps of: determining whether or not said engine is operating in a predetermined decelerating region requiring interruption of the fuel supply to said engine; and prohibiting execution of said step (5) of regarding said parameter as abnormal, when it is determined that said engine is operating in said predetermined decelerating region.

9. A method as claimed in claim 5, wherein said control of the operation of said engine comprises controlling the quantity of fuel being supplied to said engine.

* * * * *